April 30, 1935.  G. W. SMITH, JR  1,999,599
METHOD OF CONSTRUCTING VALVE SEATS FOR INTERNAL
COMBUSTION ENGINES AND SIMILAR MECHANISMS
Filed March 18, 1932   4 Sheets-Sheet 1

Inventor
George W. Smith, Jr.
By
R M Cooper
Attorney

April 30, 1935.  G. W. SMITH, JR  1,999,599
METHOD OF CONSTRUCTING VALVE SEATS FOR INTERNAL
COMBUSTION ENGINES AND SIMILAR MECHANISMS
Filed March 18, 1932   4 Sheets-Sheet 2
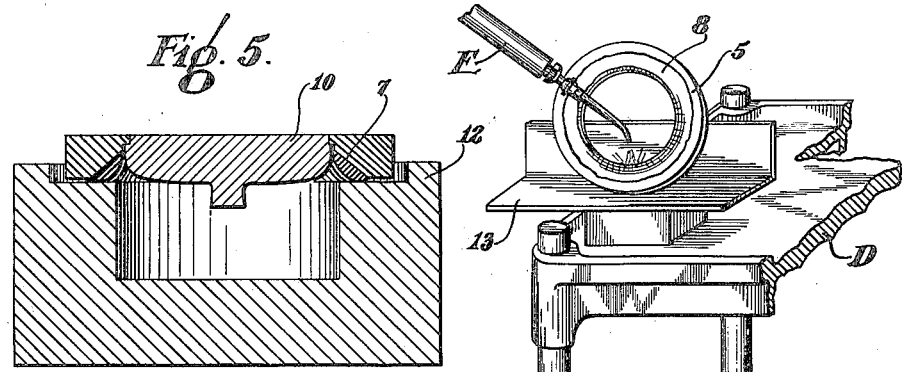
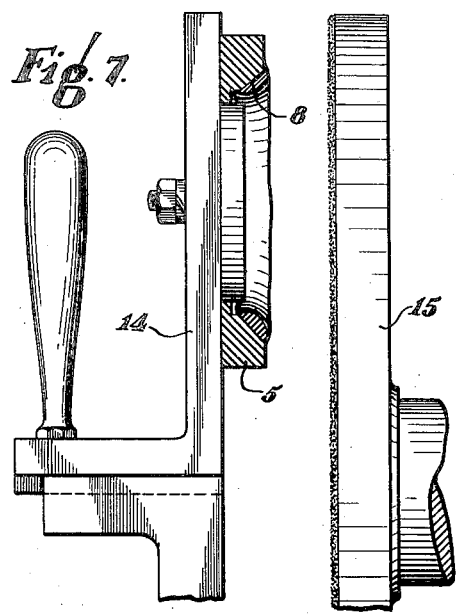
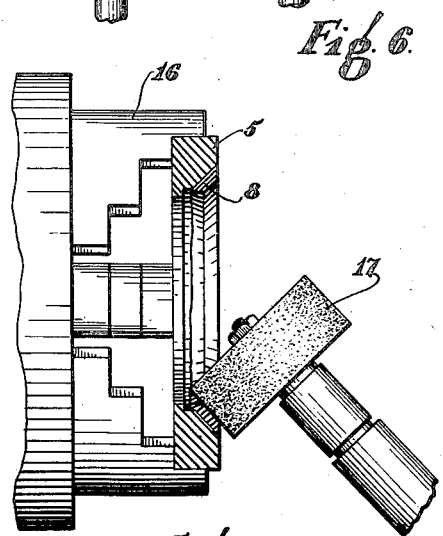
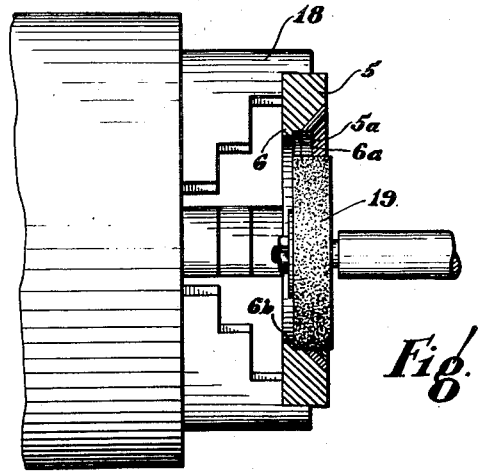
INVENTOR
George W. Smith, Jr.
BY R M Cooper
ATTORNEY

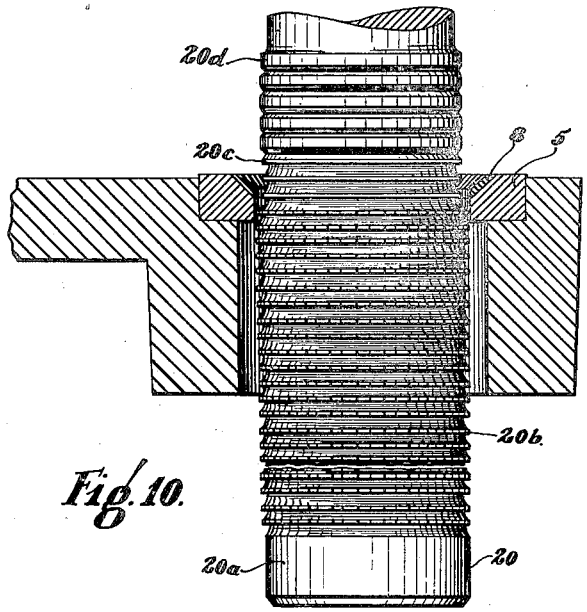
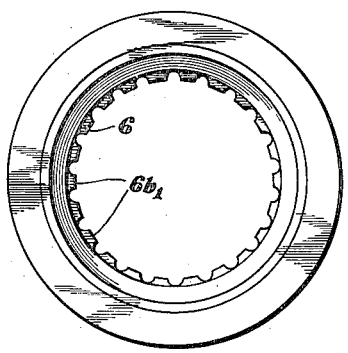
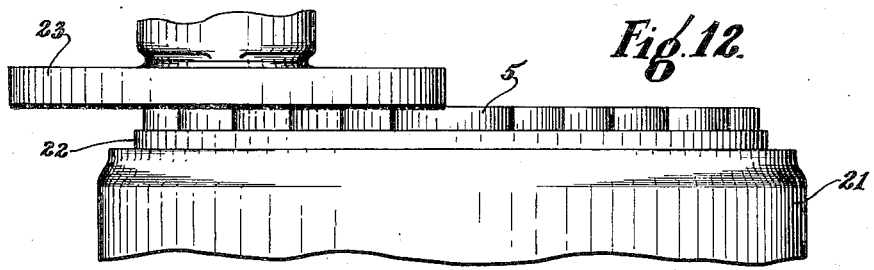
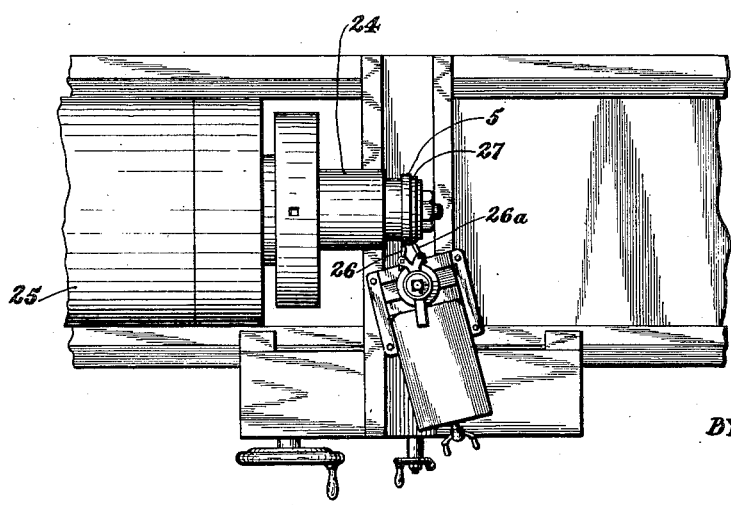

Patented Apr. 30, 1935

1,999,599

UNITED STATES PATENT OFFICE 1,999,599

METHOD OF CONSTRUCTING VALVE SEATS FOR INTERNAL COMBUSTION ENGINES AND SIMILAR MECHANISMS

George W. Smith, Jr., Cleveland, Ohio, assignor to The White Motor Company, Cleveland, Ohio, a corporation of Ohio Application March 18, 1932, Serial No. 599,837

11 Claims. (Cl. 29—156.7)

This invention relates to a method of constructing valve seats for internal combustion engines and similar mechanisms.

It is often necessary in the construction of internal combustion engines, in order to obtain valve seats capable of efficaciously withstanding high temperatures, and the hammering and grinding action of the valves, to construct the valve seats of a different material than that used in the associated parts of the engines. In many instances, it has been found expedient in order to avoid difficult and expensive methods of securing the valve seat material in place, to secure the valve seat material upon a base member, and to secure the unit thus formed in place within the engine.

It is an object of this invention to provide a simple method for securing a valve seat material upon a base member, and further to secure the valve seat material upon the base member in a configuration permitting the formation therein of an internally tapered valve seat.

It is a further object of this invention to provide an efficient method of forming and machining a valve seat unit of the type comprising a base member of a relatively soft material and a valve seat portion of an extremely hard material.

Other objects and attendant advantages will appear in the following description when read in connection with the accompanying drawings, in which:

Figure 5 is a sectional view of a form first illustrated in Figure 3, and of a valve seat unit and an internally mounted plug supported upon the form in a position for removal of the plug.

Figure 6 is an isometric view illustrating a second step in the above mentioned process for welding a body of valve seat material upon a base member of a valve seat unit.

Figures 7 to 15 inclusive, illustrate in preferred order sequential steps in the machining of a valve seat unit.

Figure 1:
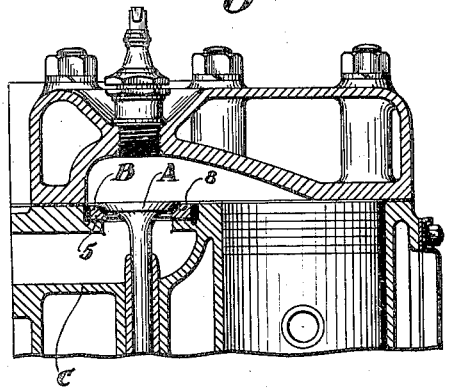
Figure 1 is a sectional view of an internal combustion engine showing the application of a valve seat unit constructed in accordance with the present invention.
Figure 16:
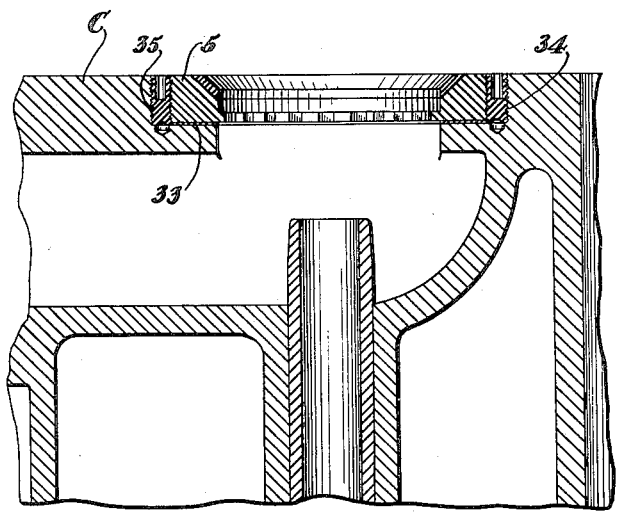
Figure 17:
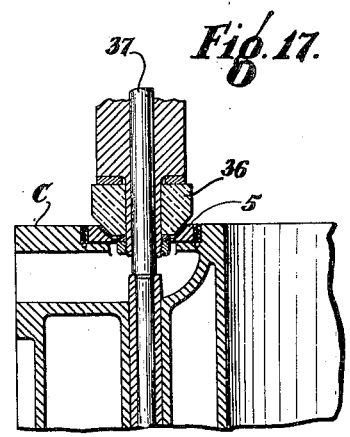

Figure 16 is an enlarged sectional view of the cylinder block of the engine illustrated in Figure 1, and Figure 17 is a view illustrating the final step in the machining of a valve seat unit.

Figure 2:
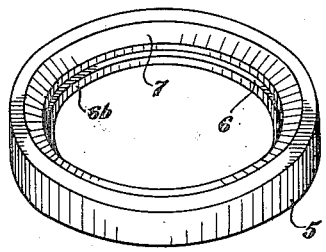
Figure 2 is an isometric view of a base member for a valve seat unit as it appeared before application of the valve seat material.
Figure 3:
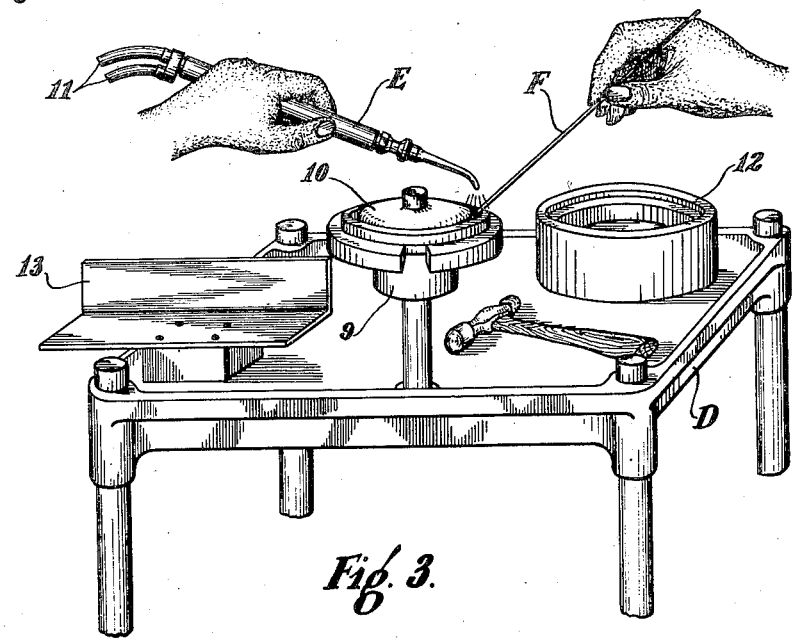
Figure 3 is an isometric view illustrating a step in a process for welding a body of valve seat material upon a base member of a valve seat unit.
Figure 4:
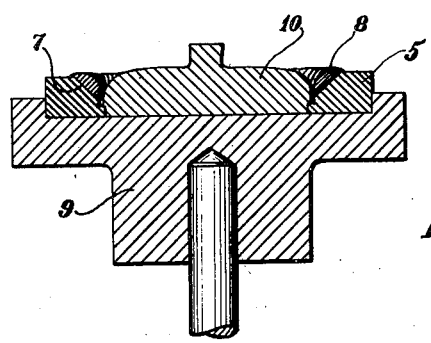
Figure 4 is a sectional view of part of the apparatus illustrated in Figure 3, showing the manner in which a partially completed valve seat unit is assembled in that part of the apparatus.

Referring to Figure 1 the reference character A designates a valve of the bevel face type, and B a valve seat unit in the cylinder block C of the engine. The valve seat unit B includes a base member 5 which may be formed of any suitable readily machinable material such as cold drawn steel. The base member 5 is in the form of an annulus, and is constructed with an internal flange 6, and a conical surface 7 machined in one face, note Figure 2, which shows a base member after the first machining operation and incident to the application of the valve seat material. Secured to the surface 7 of the base member by a fused metallic bond, there is an annular body of valve seat material 8 formed with a seat for the valve A.

The valve seat material secured upon the conical surface or seat 7 is an alloy metal commercially known as "Stellite" consisting of approximately 50% cobalt, 30% chromium and 15½% tungsten. As this material is incapable of being machined, due to its extreme hardness, except by grinding, it is essential to economic production to limit the application of such material to the zone of the valve engaging surface. Moreover, as "Stellite" is costly it is further desirable to limit the quantity of such material, and to confine the application thereof to that portion of the unit which is engaged by the valve. It is to be understood that materials or alloys other than "Stellite" are adaptable for this purpose, and that the advantages relating to the application and conservation of "Stellite" are equally applicable to the use of such materials. Preparatory to bonding the valve seat material to the insert or base member 5, the base member is placed in a work holder or chuck 9 mounted on a table D and a metal plug 10 of the form illustrated, inserted within the opening in the base member. The plug 10, for reasons hereinafter set forth, is constructed of a metal having a high melting point and possessing high thermal conductivity, such as copper.

The bonding of the valve seat material upon the surface 7 is carried on by means of an acetylene torch E connected to a source of fuel supply by means of flexible conduits 11. Following the mounting of the base member within the chuck 9, and the insertion of the plug 10 within the opening in the base member, the face 7 of the base member is heated by the torch E to a temperature at which it will fuse with the molten valve seat material later applied, care being exercised so as not to subject the plug 10 to any more heat than is necessary. The temperature to which it has been found most expedient to heat the face 7, is between a yellow and a white heat, and in the process of heating the face 7 the obtainment of such temperature is recognized by the light yellow color which it produces. When the face 7 has been brought to the proper temperature, the operator proceeds to deposit a body of valve seat material upon such surface, the deposition being accomplished by inserting a rod F of valve seat material within the flame of the torch and allowing the melted valve seat material to flow onto the surface 7, care being again exercised so as not to subject the plug 10 to any unnecessary heat. The molten valve seat material deposited upon the surface 7 is prevented from flowing into the opening in the base member by the plug 10, which due to its high conductivity and relatively high melting point does not become bonded to the valve seat material, and which in consequence of its high conductivity effects a rapid solidification of the valve seat material which flows adjacent thereto, with the result that the valve seat material is built up in a formation substantially out of contact therewith.

It will be noted that the plug 10 is formed with a diameter slightly smaller than the inside diameter of the base member, and is held in concentric relation to the base member through engagement with the flange 6 of the base member, a slight space existing between its outer peripheral surface and the inner peripheral surface of the base member. This provision of a slight space between the outer peripheral surface of the plug and the inner peripheral surface of the base member is necessary to the expeditious attainment of a proper thickness of valve seat material upon the lower edge of the conical surface 7 of the base member. Should the plug employed be formed with a diameter equal to that of the inside diameter of the base member, it would be exceedingly difficult to attain a substantial thickness of valve seat material upon the lower edge of the conical surface 7 without forming either a mechanical or a fused bond between it and the plug.

When the valve seat material has been built up into a proper configuration to permit the formation therein of a tapered seat for the valve A, the base member 5 together with the plug 10 is removed from the work holder 9 and placed within a form 12 as illustrated in Figure 5. The plug is then removed from the base member by tapping the bottom thereof with a hammer or like tool. To insure an efficient weld and a tight joint between the valve seat material and the inner edge of the tapered surface 7, the base member may be placed on an angle iron or like member 13 and the torch applied to bring the metal to a welding temperature at this joint, as shown in Figure 6.

The valve seat unit is now ready for the machining operations. The first step, preferably, is to rough grind the opposite faces of the unit. As illustrated in Figure 7, the unit is placed in a holding fixture 14 and ground upon a disc grinder 15. This operation brings the valve seat material flush with the upper surface of the base member 5, and prepares the insert for suitable securement in subsequent machining operations.

The next step is to rough grind a seat in the valve seat material. This operation is illustrated in Figure 8. The unit is mounted in a power-driven chuck 16 which supports the unit through engagement with its periphery, and the grinding effected by a small grinding wheel 17 driven in the opposite direction to the chuck, the grinding wheel being advanced against the valve seat material at the proper angle to preliminarily form the seat.

Following each of the two rough grinding steps just described, the unit is examined for porosity in the valve seat material and if porosity is found to exist the valve seat material is removed from the base member, a new body of material welded in place and the two rough grinding steps repeated. Through this procedure a material amount of waste is eliminated.

The next step, illustrated in Figure 9, consists in grinding the inner surfaces of the unit. In performing this operation, the unit is mounted within a power-driven chuck 18 which supports the unit through engagement with its periphery. The grinding is effected by a cylindrical grinding wheel 19 arranged to be driven in an opposite direction to the chuck. The grinding wheel is first adjusted so as to simultaneously finish the annular wall 5a and the face 6a of the flange 6, and then adjusted to machine the circumference 6b of the flange 6.

Following the grinding of the inner surfaces of the unit, the unit is broached as illustrated in Figure 10. The broaching tool 20, employed herein, comprises a plain cylindrical guiding surface or land 20a which is proportioned to engage and pilot the work upon the surface 6b. Adjacent the guiding portion is a serrated toothed section 20b which cuts a series of grooves in the flange 6. The upper portion of the tool is constructed with non-serrated cutting teeth 20c and burnishing teeth 20d which act to size and polish the remaining portions $6b_1$ of the surface 6b. The purpose of cutting grooves in the flange 6 is to permit the use in securing the unit within the cylinder head of a special wrench formed with componental teeth, while the purpose of accurately finishing and polishing the remaining portions of the surface 6b is to provide an arrangement of accurate surfaces $6b_1$ upon which to pilot the unit in subsequent machining operations.

After the broaching operation, the unit is placed in a precision grinding machine 21, Figure 12, which comprises a rotatably mounted power-driven table 22, and a power-driven grinding wheel 23 driven in the opposite direction to the table. In this machine, the faces of the unit are ground parallel and to finished thickness. Figure 12 shows a plurality of units being faced in one operation.

The next operation as shown in Figure 13 is turning the outside circumference of the unit. In this step the work is mounted upon a stub arbor 24 which is formed to pilot the unit upon the inner surfaces $6b_1$, and the arbor then mounted in a lathe 25 in which the turning is performed. The lathe 25 is provided with two turning tools 26 and 26a, the former being adapted to turn the circumference of the member 5, and the latter to form an annular groove 27 in the face of the member 5. The purpose of the groove 27 is to provide a clearance between the threads later formed on the unit and the bottom of its threaded seat in the cylinder block. The provision of such clearance is made necessary by the manner in which the seat in the block is threaded, the threading of such seat being performed with a conventional threading tool which does not operate to thread the bottom end of the seat.

Figure 14:
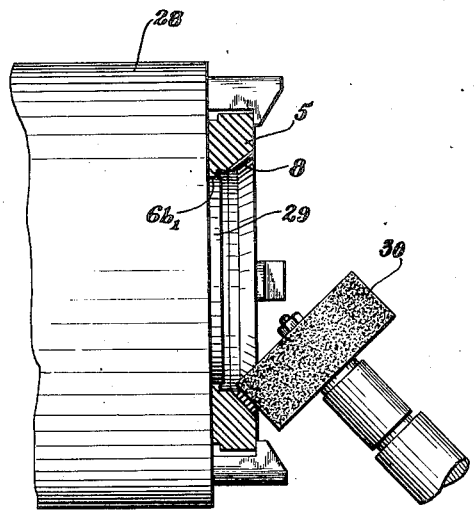

The next step, illustrated in Figure 14, consists in semi-finish grinding the valve seat. In performing this operation, the unit is placed within a power-driven chuck 28 comprising a pilot column 29 which engages with the surface 6b₁ to hold the unit in place. The grinding is effected by a grinding wheel 30 which is arranged to be driven in an opposite direction to the chuck, and which is advanced against the valve seat material at a proper angle to form the valve seat surface.

Figure 15:
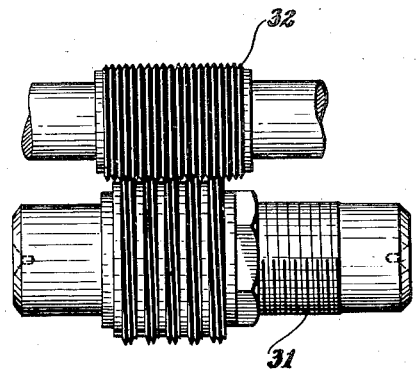

The next step consists in threading the outside diameter of the member 5, as shown in Figure 15. A number of the units are here placed upon an arbor 31 which is formed to pilot the units on their inner surfaces 6b₁, and the units hobbed in the usual manner by means of cutters 32 in a thread cutting machine.

The unit is now ready for insertion into the cylinder block C. A steel washer 33 is first placed in an annular interior threaded recess formed in the block C, following which, the valve seat unit is screwed into the threaded recess. The unit is set up tightly in the block by means of the special tool before referred to, after which, the two apertures 34 are drilled partially within the unit and partially within the head. The apertures 34 are then threaded and screws 35 screwed into the same. It is preferred to coat the washer 33 and the threaded portion of the base member with a solution which will effectuate corrosion. A solution such as ammonium chloride may be employed for this purpose. The purpose of this procedure is to insure adfixture of the unit within the block so that the unit can under no circumstance become displaced.

After the unit is positioned in the cylinder block, the final grinding and seating operation shown in Figure 17 is performed. This operation is carried out through the medium of a grinding device, such device comprising a grinding wheel 36 of conical formation which is aligned and piloted from the valve stem guide in the cylinder block by means of a removable pin 37.

It will be understood that the foregoing method is not restricted to the sequential steps set forth as certain steps may be omitted or changed in order of occurrence, and other minor changes made without departing from the spirit and scope of the invention.

What I claim is:—

1. The method of securing to an apertured member a body of valve seat material of proper configuration to permit the formation therein of a tapered valve seat, which comprises forming in the face of said member a recess in circumambient relation to the aperture in said member and opening into said aperture, and welding to the surface of said member within the aforesaid recess a body of valve seat material through the process of (a) heating the aforesaid surface of said member to a temperature at which it will fuse with the molten valve seat material later applied thereto, and (b) depositing upon the aforesaid surface of said member a body of valve seat material by applying the same to the aforesaid surface in a molten state in the presence of a member of high conductivity extending into said base member and constructed with a surface which occupies a position in closely spaced relation to the aforesaid surface of said base member.

2. The method of securing to an apertured member a body of valve seat material of proper configuration to permit the formation therein of a conical valve seat, which comprises forming in the face of said member a conical recess in circumambient relation to the aperture in said member, and welding to the surface of said member within the aforesaid recess a body of valve seat material through the process of (a) heating the aforesaid surface of said member to a temperature at which it will fuse with the molten valve seat material later applied thereto, and (b) depositing upon the aforesaid surface of said member a body of valve seat material by applying the same to the aforesaid surface in a molten state in the presence of a copper member extending into said base member and constructed with a surface which occupies a position in closely spaced relation to the aforesaid surface of said base member.

3. The method of constructing a composite valve seat unit which comprises forming a conical surface on an apertured base member in circumambient relation to the aperture in said member, welding to said conical surface a body of valve seat material through the process of (a) heating said surface to a temperature at which it will fuse with the molten valve seat material later applied thereto, and (b) depositing upon said surface a body of valve seat material by applying the same to said surface in a molten state in the presence of a member of high conductivity extending into said base member and constructed with a surface which occupies a position in closely spaced relation to the aforesaid conical surface of said base member, and forming said body of valve seat material with a conical valve seat tapering in the same direction as the aforesaid conical surface formed on said base member.

4. The method of constructing a composite valve seat unit, which comprises forming a conical surface on an apertured base member in circumambient relation to the aperture in said member, heating said surface and depositing molten valve seat metal onto said surface to effect a weld, restraining the flow of the metal to permit the metal to properly build up and solidify in a built up condition, machining said base member with an accurate circular inner surface, turning an outer surface on said base member concentric with said inner surface, with said inner surface serving as a piloting means, machining a conical surface in said valve seat material concentric to said inner surface and tapering in the same direction as the conical surface formed on said base member, and threading the outer turned surface of said member.

5. The method of constructing a composite valve seat unit, which comprises forming a conical surface on an apertured base member in circumambient relation to the aperture in said member, heating said surface and depositing molten valve seat metal on said surface to effect a weld, restraining the flow of the metal to permit the metal to properly build up and solidify in a built up condition, broaching the inside diameter of said member to provide an accurate inner surface, turning an outer surface on said base member concentric with said inner surface, with said inner surface serving as a piloting means, machining a conical surface in said valve seat material concentric to said inner surface and tapering in the same direction as the conical surface formed on said base member, and threading the outer turned surface of said member.

6. The method of securing to an apertured member a body of valve seat material of proper configuration to permit the formation therein of a conical valve seat which comprises forming in the face of said member a conical recess in circumambient relation to the aperture in said member; and welding to the conical surface of said member within the aforesaid recess a body of valve seat material through the process of (a) heating the aforesaid conical surface of said member to a temperature at which it will fuse with the molten valve seat metal later applied thereto, and (b) depositing upon the aforesaid conical surface a body of valve seat material by applying the same to the aforesaid conical surface in a molten state in the presence of a member of high conductivity extending into said base member and formed with an outer peripheral surface which occupies a position in closely spaced relation to the inner peripheral surface of said base member which joins with the aforesaid conical surface, the deposition of the valve seat material being accomplished by heating a small rod of valve seat material in the heat of a flame and allowing the melted material to flow onto the aforesaid conical surface.

7. The method of constructing a composite valve seat unit, which comprises forming a conical surface on an apertured base member in circumambient relation to the aperture in said member; welding to the aforesaid conical surface a body of valve seat material through the process of (a) heating the aforesaid conical surface of said member to a temperature at which it will fuse with the molten valve seat material later applied thereto, and (b) depositing upon the aforesaid conical surface of said member a body of valve seat material by applying the same to said conical surface in a molten state in the presence of a member of high conductivity mounted within said base member and formed with an outer surface, one portion of which occupies a position in closely spaced relation to the inner peripheral surface of said base member which joins with the aforesaid conical surface, and an adjoining portion of which extends above the lower edge of the aforesaid conical surface of said base member and tapers inwardly, the deposition of the valve seat material upon said conical surface being accomplished by heating a small rod of valve seat material in the heat of a flame and allowing the melted material to flow onto said conical surface; machining a flat surface on the face of the unit which includes as a part of its surface the welded on valve seat material; with the outer peripheral surface of said base member serving as a piloting means, machining a preliminary conical seat in said valve seat material tapering in the same direction as the conical surface formed on said base member; machining said base member with an accurate circular inner surface; with the aforesaid circular inner surface serving as a piloting means, turning an outer surface on said member concentric with the aforesaid circular inner surface, and machining the surface of the conical seat formed in said valve seat material concentric with the aforesaid circular inner surface.

8. The method of securing to an apertured member a body of valve seat material of proper configuration to permit the formation therein of a tapered valve seat, which comprises forming in the face of said member a recess in circumambient relation to the aperture in said member and opening into said aperture, and welding to the surface of said member within the aforesaid recess a body of valve seat material through the process of (a) heating the aforesaid surface of said member to a temperature at which it will fuse with the molten valve seat material later applied thereto, (b) depositing upon the aforesaid surface of said member a body of valve seat material by applying the same to the aforesaid surface in a molten state in the presence of a member of high conductivity extending into said base member and constructed with a surface which occupies a position in closely spaced relation to the aforesaid surface of said base member, and (c) building up the valve seat material substantially entirely out of contact with said member of high conductivity.

9. The method of securing to an apertured member a body of valve seat material of proper configuration to permit the formation therein of a conical valve seat, which comprises forming in the face of said member a conical recess in circumambient relation to the aperture in said member, and welding to the surface of said member within the aforesaid recess a body of valve seat material through the process of (a) heating the aforesaid surface of said member to a temperature at which it will fuse with the molten valve seat material later applied thereto, (b) depositing upon the aforesaid surface of said member a body of valve seat material by applying the same to the aforesaid surface in a molten state in the presence of a copper member extending into said base member and constructed with a surface which occupies a position in closely spaced relation to the aforesaid surface of said base member, and (c) building up the valve seat material substantially entirely out of contact with said copper member.

10. The method of constructing a composite valve seat unit, which comprises forming a conical surface on an apertured base member in circumambient relation to the aperture in said member, heating said surface and depositing molten valve seat metal onto said surface to effect a weld, restraining the flow of the metal to permit the metal to properly build up and solidify in a built up condition, machining said base member with an accurate circular inner surface, turning an outer surface on said base member concentric with said inner surface, and with said inner surface serving as a piloting means, machining a conical surface in said valve seat material concentric to said inner surface and tapering in the same direction as the conical surface formed on said base member.

11. The method of constructing a valve seat unit which comprises forming in the face of an apertured base member a recess in circumambient relation to the aperture in said member and opening into said aperture, welding to the surface of said member within the aforesaid recess a body of valve seat material through the process of (a) heating the aforesaid surface of said member to a temperature at which it will fuse with the molten valve seat material later applied thereto, (b) depositing upon the aforesaid surface of said member a body of valve seat material by applying the same to the aforesaid surface in a molten state in the presence of a member of high thermal conductivity extending into said base member and constructed with a surface which occupies a position in closely spaced relation to the aforesaid surface of said base member, and (c) building up the valve seat material substantially entirely out of contact with said member of high thermal conductivity, and machining in concentric relation to each other upon the unit formed by the preceding steps a circular outer surface, a circular inner surface, and a conical valve seat surface.

GEORGE W. SMITH, Jr.